United States Patent [19]
Huizer et al.

[11] Patent Number: 5,873,022
[45] Date of Patent: Feb. 16, 1999

[54] METHOD OF RECEIVING COMPRESSED VIDEO SIGNALS USING A LATENCY BUFFER DURING PAUSE AND RESUME

[75] Inventors: Cornelis M. Huizer; Lucas M.W.M. Karel; Frank Bosveld; Pieter J. De Visser, all of Eindhoven, Netherlands

[73] Assignee: U.S. Philips Corporation, New York, N.Y.

[21] Appl. No.: 683,993

[22] Filed: Jul. 19, 1996

[30] Foreign Application Priority Data

Jul. 21, 1995 [EP] European Pat. Off. ............. 95202019

[51] Int. Cl.$^6$ .................................................. H04N 7/173
[52] U.S. Cl. ............................ 455/4.2; 455/5.1; 455/6.2; 348/7; 348/10
[58] Field of Search ................................. 348/7, 12, 13, 348/10, 384, 423, 714; 455/4.2, 5.1, 6.2, 6.3; 395/200.49, 200.48, 200.47; H04N 7/16, 7/173

[56] References Cited

U.S. PATENT DOCUMENTS

| | | | |
|---|---|---|---|
| 5,357,276 | 10/1994 | Banker et al. ............................... | 348/7 |
| 5,448,568 | 9/1995 | Delpuch et al. ......................... | 372/94.2 |
| 5,477,263 | 12/1995 | O'Callaghan et al. ...................... | 348/7 |
| 5,635,979 | 6/1997 | Kostreski et al. ......................... | 348/13 |
| 5,652,627 | 7/1997 | Allen ............................................ | 348/7 |
| 5,663,962 | 9/1997 | Caire et al. ............................. | 348/419 |
| 5,751,336 | 5/1998 | Aggarwal et al. ........................... | 348/7 |
| 5,781,227 | 7/1998 | Goode et al. ................................ | 348/7 |

FOREIGN PATENT DOCUMENTS

| | | |
|---|---|---|
| 0610055A2 | 8/1994 | European Pat. Off. . |
| WO9628816 | 9/1996 | WIPO . |

*Primary Examiner*—Chris Grant
*Attorney, Agent, or Firm*—Laurie E. Gathman

[57] ABSTRACT

The invention relates to the reception of MPEG encoded television signals from a Video-On-Demand server (1) via a network (3). Non-linear playback functions such as 'pause' and 'resume' require a very accurate control of the bit stream, taking account of typical network aspects such as network latency. The receiver (2) comprises a latency buffer (24) for storing the signal delivered while the reproduction is stalled. The pause and resume commands from the user are not forwarded to the server until the latency buffer reaches a predetermined fullness. This allows the receiver to resume flawlessly signal reproduction after a pause.

4 Claims, 3 Drawing Sheets

METHOD OF RECEIVING COMPRESSED VIDEO SIGNALS USING A LATENCY BUFFER DURING PAUSE AND RESUME

FIELD OF THE INVENTION

The invention relates to a method of receiving compressed television signals. The invention also relates to an arrangement for carrying out said method, more particularly, an arrangement such as a digital set top box for receiving MPEG compressed audio and video signals from a video-on-demand server.

BACKGROUND OF THE INVENTION

The so-called "Transport stream" and "Program Stream" as defined within the MPEG-2 standard provide a standardized mechanism for the transmission and storage of MPEG compressed audio and video (A/V) information. Both streams contain time stamps to synchronize the decoding and presentation of the conveyed audio and video information while ensuring that data buffers in the decoders do not overflow or underflow during linear playback. In addition, these time stamps are used for the correct delivery of the streams themselves. The MPEG Transport Stream is tailored to the communication or the storage of one or more programs of digital data in environments in which significant errors may occur. Such environments are for example terrestrial and satellite broadcast channels, cable channels, and other telecommunication networks. The MPEG Program Stream is tailored to communication or storage of one program of digital data in environments where errors are very unlikely, and where software processing of system coding is a major consideration. Such environments are, for example, PCs with optical and magnetic storage media.

In the last few years, significant effort has been devoted to applications that involve the linear playback and transmission of Program and Transport Streams. For example, broadcasting MPEG-2 encoded programs involves the distribution of Transport Streams of infinite length. However, the non-linear playback of MPEG Transport Streams and Program Streams from video servers has not received the same level of attention. Nonlinear playback involves the interruption and continuation of the stream and is necessary for basically all kinds of trick modes. Trick-modes require an accurate control of the stream. For local disc-based systems, solutions are known to support trick-modes such as pause, slow motion, and fast forward. However, the known solutions can not be applied to network environments, because networks differ from local systems in two aspects.

The first aspect is the delay decoder-network-server-network-decoder. This delay, which is further referred to as the network latency, is not constant and can have a magnitude of up to one second. A consequence of the network latency is that after the end-user requests a pause (resulting in a stall of the decoding and display process and sending a pause command to the server), the network will continue to deliver bits to the decoder for some period of time. The subsequent continuation of the stream is also complicated by the network latency. Namely, because of the network latency there is a significant delay between the transmission of the 'Resume' command to the server and the arrival of the requested bits at the decoder. The bits delivered after the pause command and the temporary lack of bits after the resume command have to be handled by the decoder in such a way that the decoder can flawlessly resume its decoding and display process.

The second aspect is the possible presence of MPEG-2 remultiplexers in the network. The presence of remultiplexers complicates the support for trick-mode because remultiplexers allow the packets having different PIDs in a Transport Stream to be reordered. A PID is a Packet IDentifier as defined in the MPEG-2 standard. In practice this means that the packets do not enter the decoder in the same order as they were sent by the server. Note that the presence of remultiplexers does not complicate the trick-mode support for Transport Streams with only one PID, e.g. video, because remultiplexers are not allowed to reorder the packets within one PID.

OBJECT AND SUMMARY OF THE INVENTION

It is an object of this invention to provide trick-mode support for MPEG-2 Transport Streams and Program Streams in network environments.

To that end, the invention provides a method of receiving a compressed television signal from a transmitter, characterized by comprising the steps of: storing the received signal in a latency buffer prior to decoding and reproducing said signal; interrupting the reproduction of the signal upon a pause command; sending a request to the transmitter to interrupt the transmission of the signal when a predetermined first occupancy of the latency buffer is reached following said pause command; resuming the reproduction of the signal upon a resume command; and sending a request to the transmitter to resume the transmission of the signal when a predetermined second occupancy of the latency buffer is reached following said resume command.

Hereby is achieved that the decoder absorbs all bits that are delivered by the network after the 'Pause' command has been issued. For a successful continuation of the stream, the decoder requires the server to continue the stream at the same position where it has stopped the stream. This is necessary to keep the MPEG-2 data consistent. The buffer capacity should be large enough to absorb all bits delivered to the decoder after the 'Pause' command. In addition, after a 'Resume' command, the buffer should be large enough to provide enough bits to the decoding process until bits arrive from the server. This implies that the buffer should be large enough to accommodate twice the worst case network latency.

With this approach, the transmission of the 'Pause' and 'Resume' commands is conditioned on the fullness of the latency buffer. The latency buffer is emptied by the decoding process at a bit rate $0<R<R_{max}$ bits/s. When the decoding process is active, the fullness of the buffer is constant in time. When the decoding process is stopped, the buffer fullness increases a rate of R bits/s. When the buffer fullness passes the half-full watermark, a 'Pause' command is sent to the server. The 'Pause' command may be a 'Pause immediate' command or specify a time code whose value equals 'now plus the worst case network latency'. Because of the network latency, the buffer is filled until the server stops sending bits. The fullness of the buffer is then constant in time. When the decoding process is continued, the buffer fullness decreases. When it drops below the watermark, a 'Resume' command is transmitted to the server. The fullness of the buffer continues to reduce until the first bits are delivered from the network.

The invention concentrates on two trick-modes, namely: 'pause/continue' and 'slow motion'. The required functionality for 'pause and continue' is that a user can pause the display at any point in time and can continue flawlessly afterward. Preferably, interruption takes effect immediately e.g. at the frame/field which is currently displayed and continuation should occur at the next frame without any missing or duplicated frames. 'Pause and continue' involves the transmission of 'Pause' and 'Resume' commands from the decoder to the server to stop and continue the stream. The required functionality for 'slow motion' is that a user can visualize the stream at a speed less than the normal playback speed. The decoder should be able to switch between the slow motion mode and normal playback mode. The switch should take effect immediately without any missing or duplicated frames. 'Slow motion' also involves the transmission of 'Pause' and 'Resume' messages from the decoder to the server to start and stop the stream.

These and other aspects of the invention will be apparent from and elucidated with reference to the embodiments described hereinafter.

DESCRIPTION OF PREFERRED EMBODIMENTS

Figure 1:
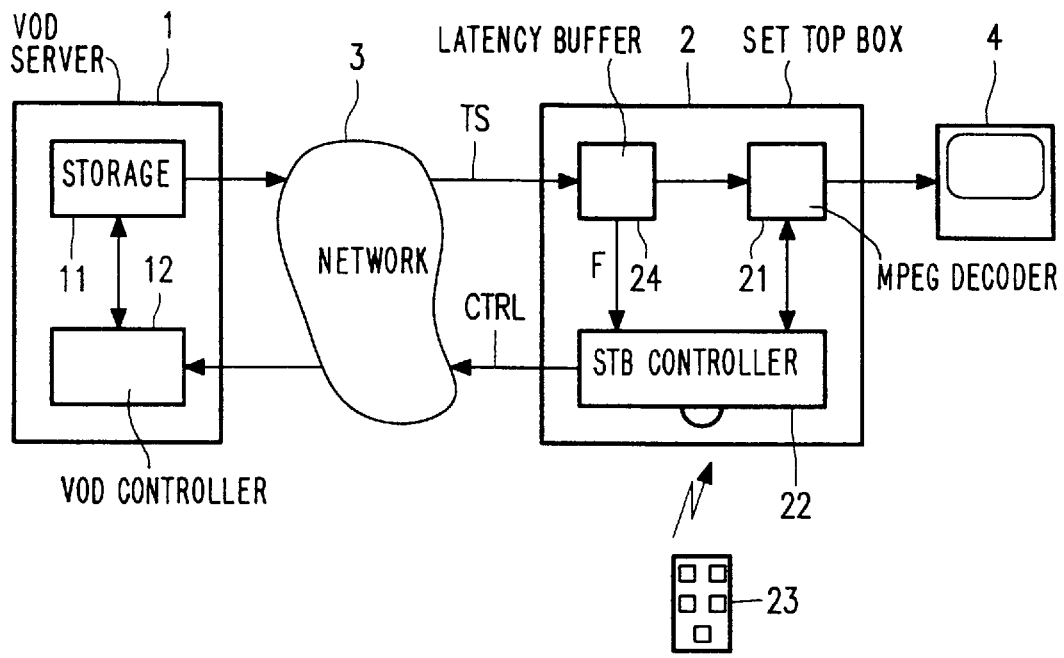
FIG. 1 shows a system comprising a Video-On-Demand server and a receiver in accordance with the invention.

FIG. 1 shows a system comprising a Video-On-Demand (VOD) server 1 and a set top box (STB) 2 connected via a network 3. The VOD-server comprises a storage medium 11 and a VOD-controller 12. The STB comprises an MPEG decoder 21, an STB-controller 22 and a (remote) control unit 23, and is connected to a reproduction device 4. A latency buffer 24 is connected between the set top box input and the MPEG decoder 21. The buffer fullness F is applied to STB-controller 22. User commands from remote control unit 23 are also applied to the STB-controller 22 and, as far as they require actions to be taken by the server, transmitted to the VOD-controller 12 via the network 3 as a control signal CTRL. A selected television program is transmitted from the server 1 to STB 2 in the form of an MPEG Transport Stream TS.

A plurality of television programs is stored on storage medium 11 which usually is an array of hard disks. From the STB point of view, the server behaves as a remote video recorder. The stored television programs can be played back at various speeds, paused and resumed. Generally, the positions where the program can be paused and resumed are restricted, depending on how the signal is physically stored. For example, the positions have to correspond with disk sector or disk cylinder boundaries. Because the signal is compressed, i.e. the amount of disk space varies from picture to picture, resume positions are irregularly distributed over playback time.

Generally, television programs comprise a video signal, several audio signals and additional data for, inter alia, subtitles in various languages. For simplicity, it will be assumed here that the television program which is transmitted from the server to the STB comprises one audio signal A and one video signal V only. Accordingly, the transport stream comprises audio packets and video packets.

Figure 2:
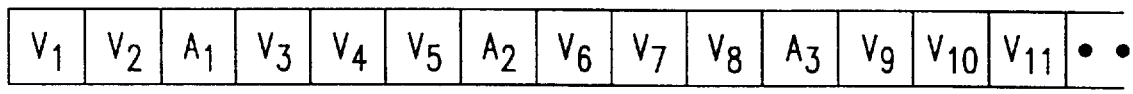
FIG. 2 shows an example of a television signal transmitted by the Video-On-Demand server which is shown in FIG. 1.

FIG. 2 shows an example of the Transport Stream TS which is transmitted by the server to the STB. The Transport Stream includes audio packets $A_1$, $A_2$, $A_3$, etc. and video packets $V_1$, $V_2$, $V_3$, etc. Each packet comprises a header and a payload. The header comprises a Packet IDentifier (PID) which identifies whether the packet carries audio data or video data. Note that the Transport Stream TS may comprise various television programs. A Program Map Table is transmitted to indicate which PIDs constitute the relevant program. In the present example, the Transport Stream TS conveys the selected television program only.

Figure 3:
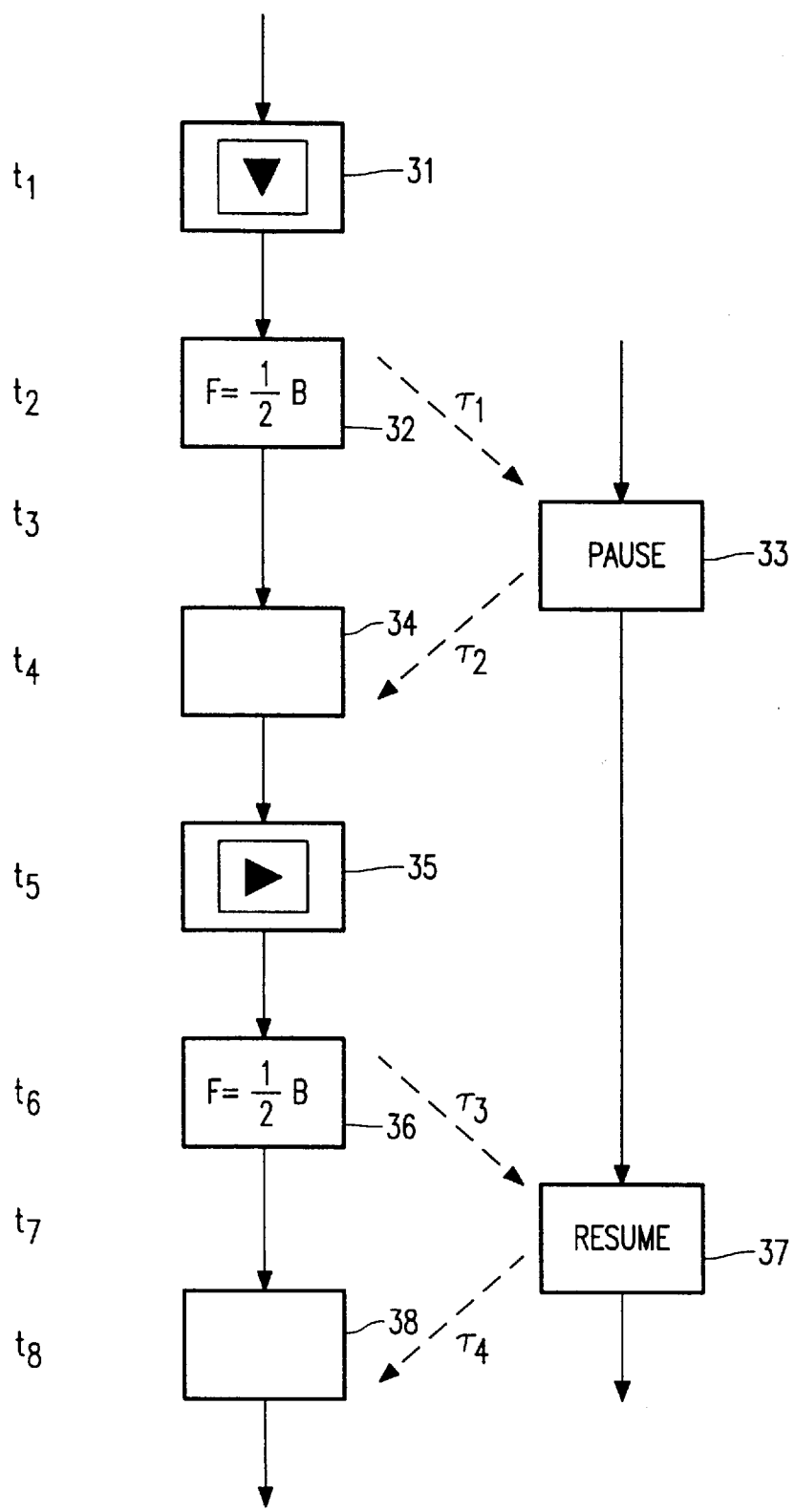
FIG. 3 shows a flow chart of operation steps carried out by the server and the receiver.

The operation of the server and the STB will now be explained collectively with reference to FIG. 3, which shows a flow chart of operation steps carried out by the STB (left side of the Figure) and the server (right side of the Figure). In a step 31, at $t=t_1$, the STB receives a pause command and stalls the reproduction of the signal, i.e. the video display is frozen and the audio reproduction is stopped. Meanwhile, the network delivers bits and the latency buffer fullness F increases.

In a step 32, the STB-controller checks whether the buffer fullness assumes a predetermined value, for example F=½B, in which B is the buffer capacity. If that is the case, the controller forwards the pause command to the server at $t=t_2$. The pause command is received by the server in a step 33, at $t=t_3$, with a delay $\tau_1$ due to the latency of the network. In response to the pause command, the server instantaneously interrupts the transmission of the signal. Step 34 denotes the interruption of the signal reception at the receiver end, at $t=t_4$, due to the latency $\tau_2$ of the network.

In a step 35, at $t=t_5$, the STB resumes the reproduction of the signal in response to a resume command from the user. As a result thereof, the latency buffer fullness F decreases.

In a step 36, the STB-controller checks whether the buffer fullness assumes the predetermined value F=½B. If that is the case, the controller forwards the resume command to the server at $t=t_6$. The resume command is received by the server in a step 37, at $t=t_7$, with a delay $\tau_3$. In response to the resume command, the server instantaneously resumes transmission of the signal at the position where it was interrupted. Step 38 denotes the reception of the resumed signal at the receiver end, at $t=t_8$, with a delay $\tau_4$. It should be noted that the delays $\tau_1$–$\tau_4$ are not necessarily equal. Neither do they need to be constant over time.

Figure 4:
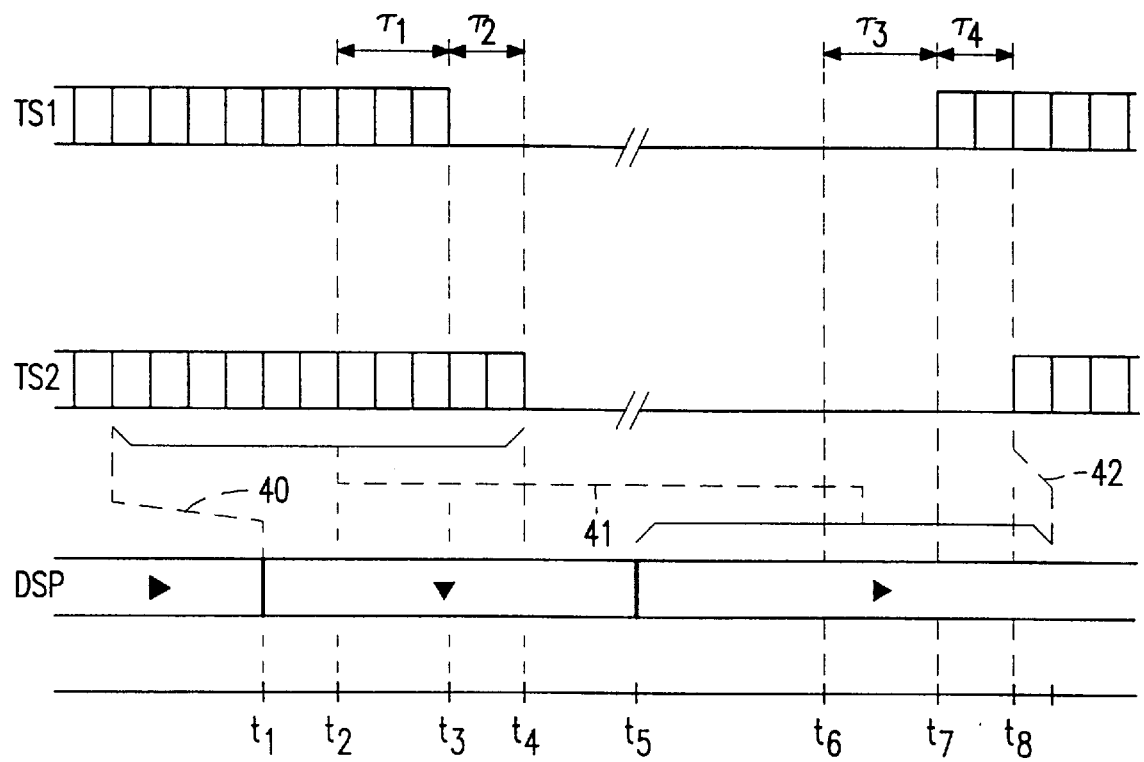
FIG. 4 shows a timing diagram illustrating the operation of the receiver.

FIG. 4 shows a timing diagram of signals at various points in the system. More particularly, TS1 denotes the Transport Stream as transmitted by the server, TS2 denotes the Transport Stream as received by the STB, and DSP denotes the reproduced signal. Reference numeral 40 denotes the delay between reception of the bit stream and reproduction thereof which is introduced by the latency buffer. The buffer capacity is assumed to be 12 packets. In the present stationary situation, 4 packets are assumed to be present in the buffer.

At $t=t_1$, the reproduction is paused which causes the buffer fullness to be increased. At $t=t_2$, when 2 more packets have entered the buffer, the buffer fullness equals half its capacity and the pause command is forwarded to the server. At $t=t_3$, the server receives the pause command and interrupts the signal transmission which becomes manifest at the receiver end at $t=t_4$. The buffer fullness now remains constant.

At $t=t_5$, the STB receives the resume command and resumes the reproduction which causes the buffer fullness to be decreased. Reference numeral 41 denotes the packets which are now decoded and reproduced. At $t=t_6$, when 5 packets have been read from the buffer, the buffer fullness again equals half its capacity and the resume command is forwarded to the server. At $t=t_7$, the server receives the resume command and resumes the signal transmission which becomes manifest at the receiver end at $t=t_8$. Reference numeral 42 denotes the delay between reception of the bit stream and reproduction after resumption of the reproduction. Now the delay corresponds with 1 packet.

Figure 5:
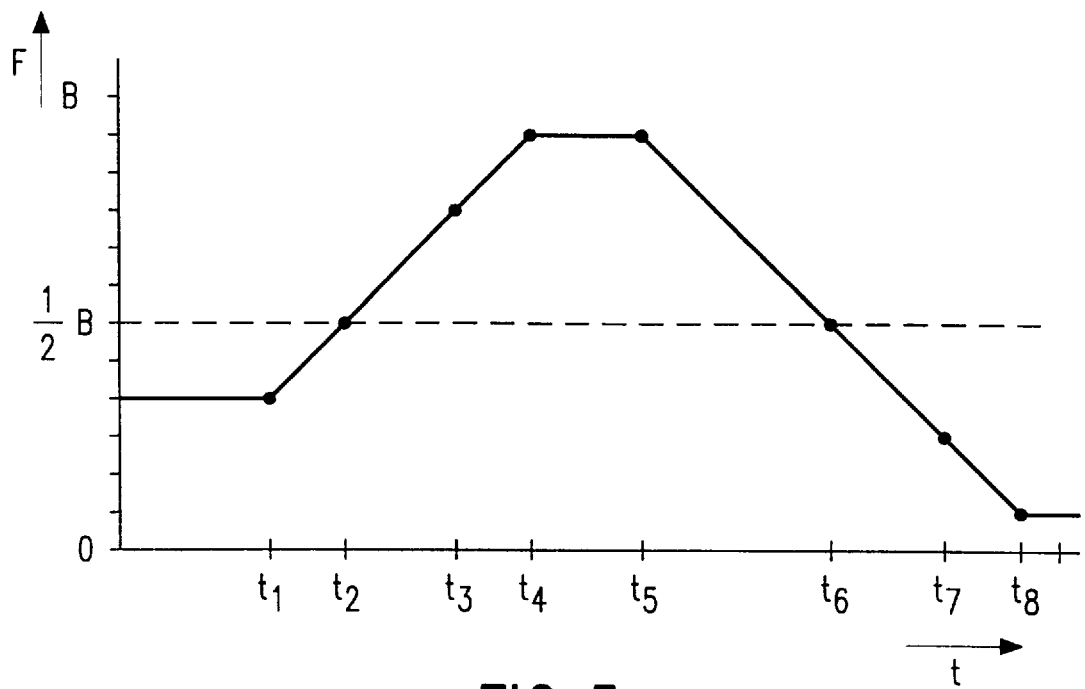
FIG. 5 diagrammatically shows the fullness of a latency buffer which is shown in FIG. 1.

For completeness, FIG. 5 shows the latency buffer fullness for the example explained above. Further explanation of this Fig. is not necessary.

In summary, the invention relates to the reception of MPEG encoded television signals from a Video-On-Demand server (1) via a network (3). Non-linear playback functions such as 'pause' and 'resume' require a very accurate control of the bit stream, taking account of typical network aspects such as network latency. The receiver (2) comprises a latency buffer (24) for storing the signal delivered while the reproduction is stalled. The pause and resume commands from the user are not forwarded to the server until the latency buffer reaches a predetermined fullness. This allows the receiver to resume flawlessly signal reproduction after a pause.

We claim:

1. A method of receiving a compressed television signal from a transmitter, characterized by comprising the steps of:

storing the received signal in a latency buffer prior to decoding and reproducing said signal;

interrupting the reproduction of the signal upon a pause command;

sending a request to the transmitter to interrupt the transmission of the signal when a predetermined first occupancy of the latency buffer is reached following said pause command;

resuming the reproduction of the signal upon a resume command; and sending a request to the transmitter to resume the transmission of the signal when a predetermined second occupancy of the latency buffer is reached following said resume command.

2. The method as claimed in claim 1, wherein said first and said second occupancy substantially correspond with half the capacity of said latency buffer.

3. A receiver for receiving a compressed television signal from a transmitter, characterized by comprising a latency buffer for storing the received signal prior to decoding and reproducing said signal, and control means arranged to:

interrupt the reproduction of the signal upon a pause command;

send a request to the transmitter to interrupt the transmission of the signal when a predetermined first occupancy of the latency buffer is reached following said pause command;

resume the reproduction of the signal upon a resume command; and send a request to the transmitter to resume the transmission of the signal when a predetermined second occupancy of the latency buffer is reached following said resume command.

4. The receiver as claimed in claim 3, wherein said first and said second occupancy substantially correspond with half the capacity of said latency buffer.

* * * * *